(12) United States Patent
Wheeler et al.

(10) Patent No.: US 11,016,002 B2
(45) Date of Patent: May 25, 2021

(54) IN SITU VIBRATION-BASED VERIFICATION OF VEHICLE DOORS

(71) Applicant: Ford Global Technologies, LLC, Dearborn, MI (US)

(72) Inventors: Joshua Wheeler, Trenton, MI (US); Scott Andrew Amman, Milford, MI (US); Michael James Whitens, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 291 days.

(21) Appl. No.: 16/175,397

(22) Filed: Oct. 30, 2018

(65) Prior Publication Data
US 2020/0132567 A1    Apr. 30, 2020

(51) Int. Cl.
*G01M 7/02* (2006.01)
*G06F 17/14* (2006.01)
*G01M 17/007* (2006.01)

(52) U.S. Cl.
CPC .......... *G01M 7/025* (2013.01); *G01M 17/007* (2013.01); *G06F 17/142* (2013.01)

(58) Field of Classification Search
CPC ................... G01N 29/045–046; G01M 7/025
See application file for complete search history.

(56) References Cited

U.S. PATENT DOCUMENTS

| | | | | |
|---|---|---|---|---|
| 5,144,838 A * | 9/1992 | Tsuboi | .................. | G01M 7/025 702/39 |
| 5,179,860 A * | 1/1993 | Tsuboi | .................. | G01M 7/025 702/39 |
| 5,812,684 A * | 9/1998 | Mark | .................... | G10K 11/178 381/86 |
| 6,101,882 A * | 8/2000 | Tran | ........................ | G01M 7/00 73/662 |
| 6,116,091 A * | 9/2000 | Tran | .................... | G05B 23/0256 73/1.82 |
| 7,181,971 B1 * | 2/2007 | Sauer | ...................... | G01M 7/04 73/670 |

(Continued)

FOREIGN PATENT DOCUMENTS

| | | | | |
|---|---|---|---|---|
| DE | 4237527 A1 * | 5/1994 | .......... | G01M 5/0066 |
| DE | 102005055113 A1 | 5/2007 | | |

(Continued)

OTHER PUBLICATIONS

AudioCheck.net, Swept Sine (Lower Spectrum) (Year: 2007).*

(Continued)

*Primary Examiner* — David L Singer
(74) *Attorney, Agent, or Firm* — Frank Lollo; Eversheds Sutherland (US) LLP

(57) ABSTRACT

In situ vibration-based verification of vehicle doors may be performed to identify defects in the doors. An example vehicle includes a vibration exciter affixed to a door and a vibration sensor affixed to a window of the door. The example vehicle also includes a processor coupled to memory storing expected vibration data. The processor performs, via the vibration exciter, a sine sweep on the door and measures, via the vibration sensor, a vibration response of the door to the sine sweep. Based on the vibration response and the expected vibration data, the processor determines whether the door is defective.

15 Claims, 4 Drawing Sheets

(56) References Cited

U.S. PATENT DOCUMENTS

| | | | |
|---|---|---|---|
| 7,984,649 B2 | 7/2011 | Kono et al. | |
| 8,365,598 B2 | 2/2013 | Menten et al. | |
| 9,791,381 B2 | 10/2017 | Lim et al. | |
| 2005/0092087 A1* | 5/2005 | Kurt-Elli | G01M 7/025 73/579 |
| 2009/0198455 A1* | 8/2009 | Bricker | G01H 1/003 702/36 |
| 2014/0100714 A1* | 4/2014 | Linn | G01M 7/02 701/2 |
| 2015/0143913 A1* | 5/2015 | Adams | G06K 9/00771 73/655 |
| 2017/0289695 A1* | 10/2017 | Bongiovi | H04R 11/02 |
| 2019/0041365 A1* | 2/2019 | Zhuge | G01N 29/46 |
| 2019/0279447 A1* | 9/2019 | Ricci | B60R 25/25 |
| 2020/0096386 A1* | 3/2020 | Palit | G01M 17/007 |

FOREIGN PATENT DOCUMENTS

| | | | | |
|---|---|---|---|---|
| JP | 2005315743 A | | 11/2005 | |
| JP | 4512548 B2 | | 7/2010 | |
| KR | 100427236 B1 | * | 4/2004 | |
| WO | WO-2014109365 A1 | * | 7/2014 | G01M 7/02 |

OTHER PUBLICATIONS

Coleman, Dynamic Defect Detection—Part I Theory, SIGNALYSIS (Year: 2015).*

Hanly, What's the Difference Between Vibration Sensors? (Year: 2018).*

* cited by examiner

IN SITU VIBRATION-BASED VERIFICATION OF VEHICLE DOORS

TECHNICAL FIELD

The present disclosure generally relates to doors of a vehicle and, more specifically, in situ vibration-based verification of vehicle doors.

BACKGROUND

Issues can arise during the construction of vehicle doors in an assembly plant. For example, spot welds may be missed or incomplete, anti-flutter and crash beams may be improperly bonded to the door skin, and stamping features may be missed. Additionally, welds may be broken and the door panel may be deformed when the door is installed into the vehicle. These kinds of structural failures often result in acoustic issues that reduce customer satisfaction. For example, defects in the door may change door closing sound quality, cause squeaks and rattles when the vehicle is driving over rough surfaces, or increase road noise boom caused by modal alignment with forced excitation from the suspension and body.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments are disclosed for in situ vibration-based verification of vehicle doors. An example vehicle includes a vibration exciter affixed to a door and a vibration sensor affixed to a window of the door. The example vehicle also includes a processor coupled to memory storing expected vibration data. The processor performs, via the vibration exciter, a sine sweep on the door and measures, via the vibration sensor, a vibration response of the door to the sine sweep. Based on the vibration response and the expected vibration data, the processor determines whether the door is defective.

An example method to validate acoustic properties of a door of a vehicle includes performing, via a vibration exciter affixed to the door, a sine sweep on the door. The example method also includes measuring, via a vibration sensor affixed to a window of the door, a vibration response of the door to the sine sweep. Additionally, the example method includes based on the vibration response and the expected vibration data, determining whether the door is defective.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1:
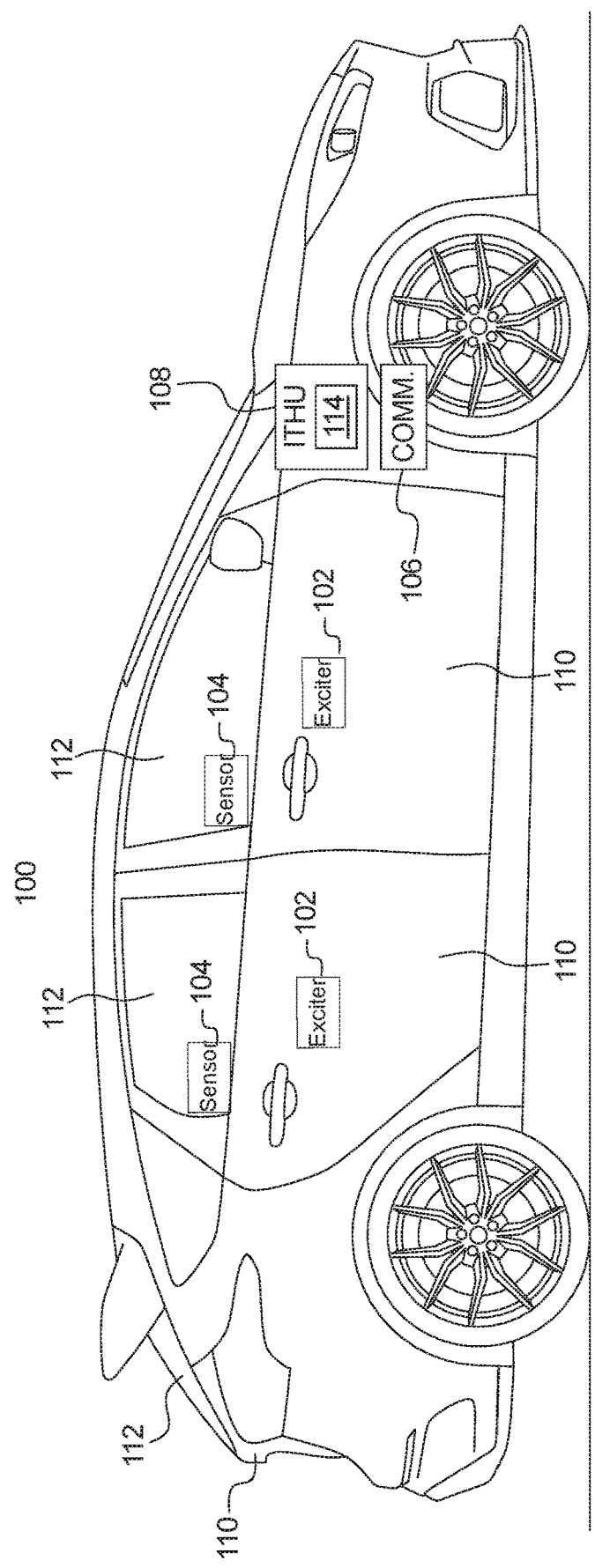
FIG. 1 illustrates a vehicle operating in accordance with the teachings of this disclosure.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

Issues during manufacturing and installation of a vehicle door can cause a negative acoustic experience for the occupants. Weak or missing welds and/or a improperly bonded crash beam can change the vibration characteristics of a door in such a manner that changes the acoustic properties of the vehicle. For example, the door may be designed to have a resonant frequency that is different to the vibrations caused by the normal operation of the vehicle. In such an example, a missing weld or a improperly bonded crash beam (sometimes referred to as an "anti-flutter beam") may cause the door to have a resonant frequency within the range of vibrations caused by the normal operation of the vehicle. These structural changes can compromise the intended door closing sound quality, introduce squeaks and rattles when driving over rough surfaces, and/or increase road noise boom due to modal alignment with forced excitation from the suspension and body.

Using existing methods, checking quality every door that is built and installed on the vehicle within the manufacturing facility's production timeline is impractical. Checking weld quality or structural bonding may require tearing down the door, measuring modal characteristics offline with impact or vibrometry measurement systems, or manual visual checks. These kind of inspections can only be employed as spot checks to ensure consistency in builds; these techniques cannot be performed on every door without compromising production speed. Some existing systems employ specialized test stands that perform testing on doors after they are constructed and before they are installed. However, using a test stand is time consuming and cannot detect defects acquired in transit to the installation site or acquired when the door is installed into the vehicle.

A system and method are described below to detect defects in a door after the door has been installed in the vehicle. At some point after the doors are installed (e.g., when the vehicle is undergoing a quality control check), the vehicle tests its doors for welding and crash beam issues and reports the results. Because the vehicle tests the doors while the doors are in situ, such a test can be performed on every door with minimal effect on production speed.

Each door (e.g., front doors, rear doors, liftgates, etc.) to be tested includes a vibration exciter and a piezo electric sensor attached to a surface, such as a window, of the door. During assembly of the door, the vibration exciter is placed within the door cavity attached to the inner side of the outer door skin. The outer door skin acts as an acoustic baffle to amplify the vibrations. In some examples, the piezo electric sensor is fixed the window to be used by various subsystem while the vehicle is in service. Alternatively, in some examples, the piezo electric sensor is temporarily attached to the vehicle for the duration of the tests. The piezo electric sensor picks up pressure waves and vibration converts those into electric current. The piezo electric sensor detects structureborne vibration. To test the door, the vibration exciter sends the stimulus to the door sheet metal and the piezo accelerometer on the window receives the vibration response from the door.

An electronic control unit (ECU) in the vehicle compares the measured vibration response to an expected vibration response. Based on the comparison, the ECU determines whether the door includes a defect. In some examples, depending on characteristics of the difference between the measured vibration response and expected vibration response, the ECU identifies a cause of the difference. For example a modal shift in the vibration response may be caused by damaged or missing welds and an amplitude shift may be caused by improper bonding of the crash beam. The ECU reports the results the tests for the doors. In some examples, the ECU displays the results (e.g., when the ECU includes a display, such as the infotainment head unit). Alternatively or additionally, the ECU sends (e.g., via an on-board communication module, etc.) the test results with an identifier of the vehicle (such as a vehicle identification number (VIN), etc.) to a central server to, for example, alert a quality control department of the manufacturer. In such a manner, the disclosed method and system provide an example benefit by providing a way to control the quality of the acoustic properties of doors by testing for defects without materially affecting manufacturing time of the vehicle.

FIG. 1 illustrates a vehicle 100 operating in accordance with the teachings of this disclosure. The vehicle 100 may be a standard gasoline powered vehicle, a hybrid vehicle, an electric vehicle, a fuel cell vehicle, and/or any other mobility implement type of vehicle. The vehicle 100 includes parts related to mobility, such as a powertrain with an engine, a transmission, a suspension, a driveshaft, and/or wheels, etc. The vehicle 100 may be non-autonomous, semi-autonomous (e.g., some routine motive functions controlled by the vehicle 100), or autonomous (e.g., motive functions are controlled by the vehicle 100 without direct driver input). In the illustrated example the vehicle 100 includes vibration exciters 102, vibration sensors 104, an on-board communication module 106, and a infotainment head unit 108.

The vibration exciters 102 are positioned within doors 110 of the vehicle 100. In some examples, the vibration exciters 102 are surface transducers. The vibration exciters 102 are in a cavity of the door 110 and are attached to the inner side of the outer door skin. The vibration exciters 102 vibrate the door skin of the corresponding door 110 in response to receiving electrical impulses. In some examples, the vibration exciters 102 are operable to perform a sine sweep in at least a range of 20-200 Hertz (Hz).

In the illustrated example, the vibration sensors 104 are affixed to the windows 112 of the doors 110. The vibration sensors 104 may be any type of accelerometer that (a) measures the vibrations perpendicular to the plane of glass of the corresponding window 112 and (b) measures a frequency range corresponding with the range of the sine sweep of the vibration exciters 102, including uniaxial or triaxial accelerometers, micromachined or piezoelectric accelerometers, etc. In the illustrated example, each one of vibration sensors 104 is rigidly mounted on a corresponding one of the windows 112 on the interior of the cabin of the vehicle 100. In some example, the vibration sensors 104 are mounted on the windows 112 in a manner as to no obstruct the view of the driver. For example, the vibration sensors 104 on the front driver's side window may be attached to the glass proximate to a corner of the window. In some examples, the vibration sensors 104 are flush enough to the window 112 as to not obstruct the opening and closing of the window 112. In some examples, the vibration sensors 104 are mounted to the retractable window glass inside the cavity of the edge of the window beneath the window regulator. In such examples, the window responds to sound waves and/or vibrations while the vibration sensors 104 do not block the view out the window and does not inhibit the motion of the window. The vibration sensors 104 are wired or wirelessly communicatively coupled to an electronic control unit (ECU), such as the infotainment head unit 108. The vibration sensors 104 send signals of the vibrations of the windows 112 to the ECU to be processed.

Alternatively, in some examples, the vibration sensors 104 include an accelerometer as described above and a wireless module that communicates via a wireless local area network (WLAN) or a personal area network (e.g., Bluetooth®, Bluetooth® Low Energy, Z-Wave®, Zigbee®, etc.). In some such examples, the vibration sensors 104 are communicatively coupled to a remote server (e.g., a cloud server, a server located in the manufacturing facility, etc.). In such examples, the vibration sensors 104 transmit the signals of the vibrations to the remote server to be processed and/or forwarded to the vehicle for processing. In some such examples, the vibration sensors 104 are temporarily affixed to the windows 112 with, for example, a temporary adhesive.

The on-board communication module 106 includes wired or wireless network interfaces to enable communication with external networks. The on-board communication module 106 also includes hardware (e.g., processors, memory, storage, antenna, etc.) and software to control the wired or wireless network interfaces. The on-board communication module 106 includes one or more communication controllers for standards-based networks (e.g., Global System for Mobile Communications (GSM), Universal Mobile Telecommunications System (UMTS), Long Term Evolution (LTE), Code Division Multiple Access (CDMA), WiMAX (IEEE 802.16m); local area wireless network (including IEEE 802.11 a/b/g/n/ac or others, sometime referred to as Wi-Fi® 5 or Wi-Fi® 6, etc.), dedicated short range communication (DSRC), and Wireless Gigabit (IEEE 802.11ad), a personal areas network (e.g., Bluetooth®, Bluetooth® Low Energy, Z-Wave®, Zigbee®, etc.) etc.). The external network(s) may be a public network, such as the Internet; a private network, such as an intranet; or combinations thereof, and may utilize a variety of networking protocols now available or later developed including, but not limited to, TCP/IP-based networking protocols. In some examples, the on-board communication module 106 transmits status information regarding whether the doors 110 include defects. In some such examples, the results are stored in a database of the remote server and/or displayed on a display communicatively coupled to the remote server. In some examples, the on-board communication module 106 receives vibration data from detachable vibration sensors 104 (e.g., via the remote server, etc.).

Figure 3:
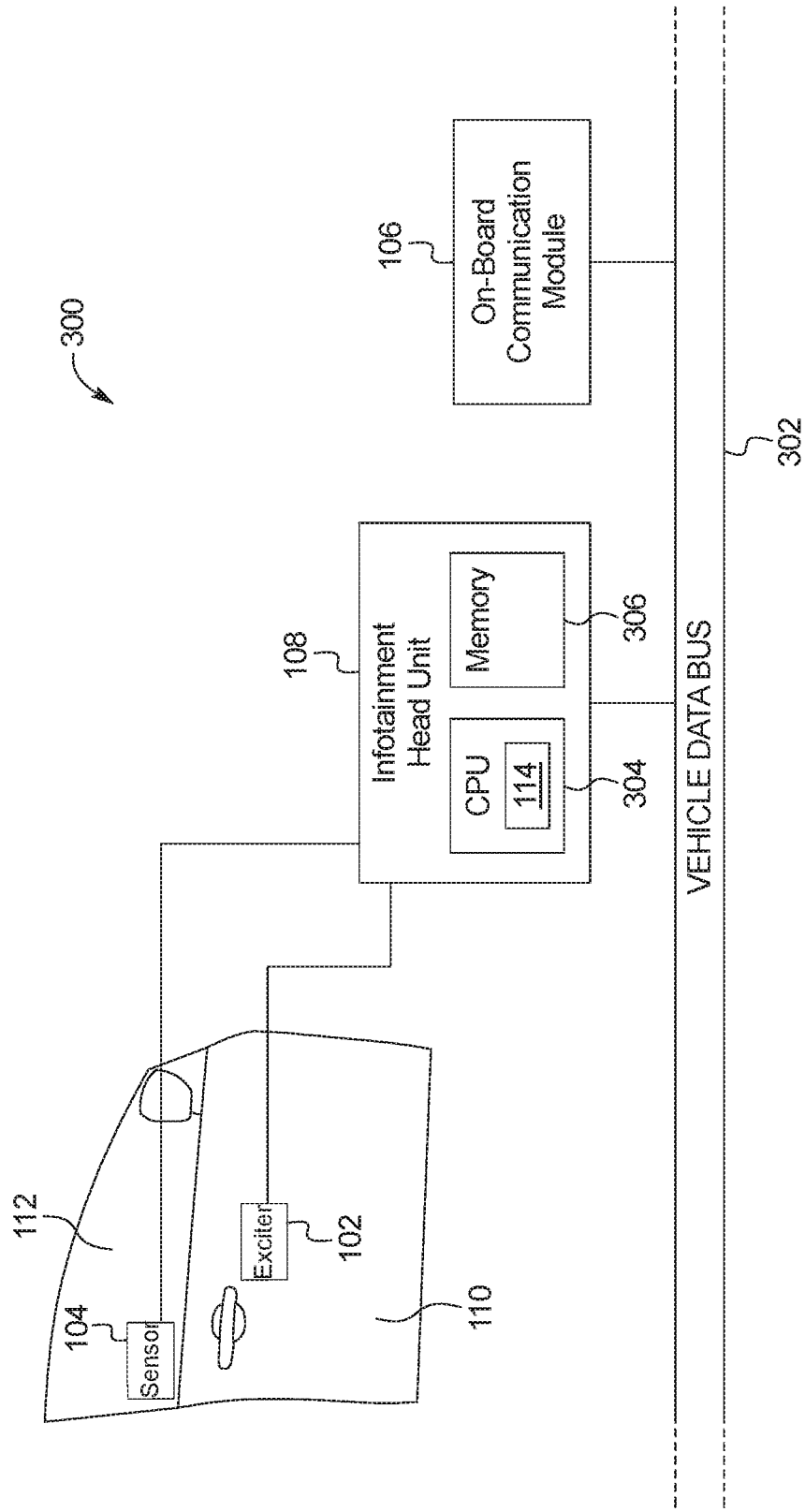
FIG. 3 is a block diagram of electronic components of the vehicle of FIG. 1.

The infotainment head unit 108 provides an interface between the vehicle 100 and a user. The infotainment head unit 108 includes digital and/or analog interfaces (e.g., input devices and output devices) to receive input from the user(s) and display information. The input devices may include, for example, a control knob, an instrument panel, a digital camera for image capture and/or visual command recognition, a touch screen, an audio input device (e.g., cabin microphone), buttons, or a touchpad. The output devices may include instrument cluster outputs (e.g., dials, lighting devices), actuators, a heads-up display, a center console display (e.g., a liquid crystal display ("LCD"), an organic light emitting diode ("OLED") display, a flat panel display, a solid state display, etc.), and/or speakers. As illustrated in FIG. 3 below, the infotainment head unit 108 includes hardware (e.g., a processor or controller, memory, storage, etc.) and software (e.g., an operating system, etc.). In some examples, the software is an infotainment system (such as SYNC® by Ford®, Android Auto by Google®, CarPlay by Apple®, etc.). In such examples, the infotainment head unit 108 displays the infotainment system on the center console display. In the illustrated example, the infotainment head unit 108 includes a door analyzer 114 that controls the vibration exciters 102 and analyzes vibration data from the vibration sensors 104. Alternatively, in some examples, the door analyzer 114 may be included in any suitable electronic control unit (ECU), such as an on-board computing platform or a body control unit, etc.

The door analyzer 114 determines whether the doors 110 have defects that could cause a change in acoustic quality. In some examples, when the vehicle 100 includes multiple doors 110 to be tested, the door analyzer 114 tests the doors 110 sequentially (e.g., one at a time and one after another). Alternatively, in some examples, the door analyzer 114 tests the doors 110 that are diagonal from each other simultaneously. The door analyzer 114 initiates the test in response to an input. In some examples, the input is received via an interface on the infotainment head unit 108. Alternatively or additionally, in some examples, the input is received via the on-board communication module 106 from the remoter server. In some examples, the input is only accepted when the ECUs of the vehicle 100 are in a diagnostic mode or a factory mode (e.g. a mode that is not available when the vehicle 100 is in motion).

The door analyzer 114 controls the vibration exciters 102 to cause the outer skin of the door 110 to vibrate. The door analyzer 114 uses a sine sweep to vibrate the door. In some examples, the door analyzer 114 uses a sine sweep from 20 Hz to 200 Hz. The door analyzer 114 receives vibration response data from the vibration sensors 104 in response to the sine sweep. The measured vibration response data is the signal that is generated by the vibration sensors 104 while the corresponding vibration exciter 102 is vibrating the outer skin of the door 110. The door analyzer 114 performs Fast Fourier transforms (FFT) analysis on the vibration response data. Based on the FFT analysis, the door analyzer 114 then identifies the modes and amplitudes in the measured vibration response data. For example, modes of the measured vibration response data may be at 72 Hz, 140 Hz, and 185 Hz. The door analyzer 114 compares the modes and amplitudes in the measured vibration response data to data modes and amplitudes of expected vibration response data (e.g., stored in memory 306 of FIG. 3 below). The expected vibration response data is associated with a make and/or model of a vehicle. To produce the expected vibration response data, an "ideal" door (e.g., a door known to be free of defects) of a make and/or model may be tested.

Figure 2A:
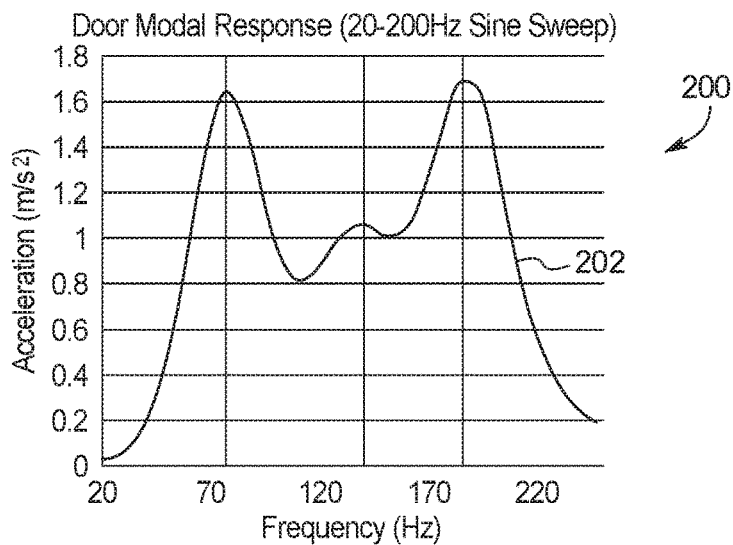
FIG. 2A illustrated an example expected vibration profile of a door of the vehicle of FIG. 1.
Figure 2B:
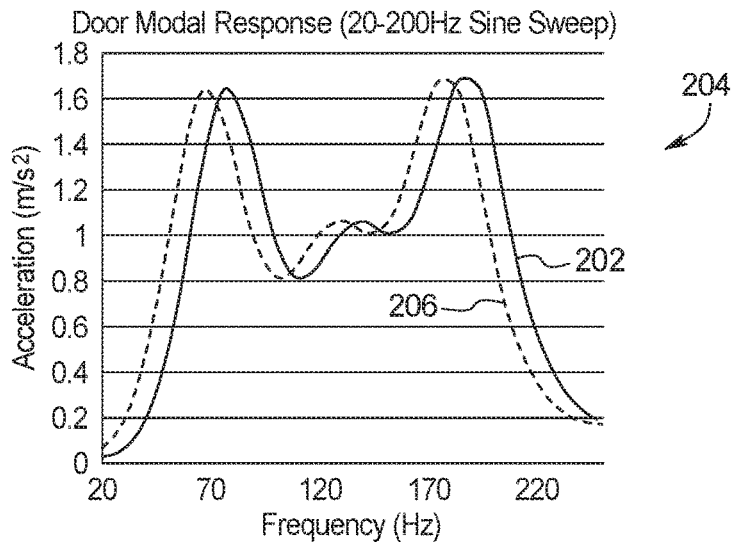
FIGS. 2B and 2C illustrate example vibration profiles that deviate from the expected vibration profile of FIG. 2A.
Figure 2C:
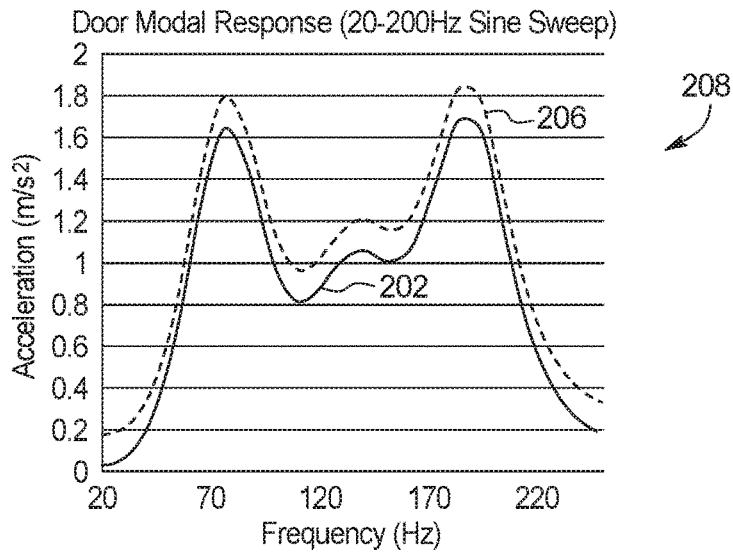

FIG. 2A is a graph 200 of expected vibration response data 202. The door analyzer 114 determines that the tested door 110 is defective when the measured vibration response data deviates from the expected vibration response data. In some examples, the expected vibration response data includes tolerance bands around the expected vibration response data. For example, the tolerance bands may be defined to allow a ten percent modal shift in either direction and a ten percent deviation in amplitude in either direction. In such examples, the door analyzer 114 determines that the tested door 110 is defective when the measured vibration response data falls outside of the tolerance bands of the expected vibration response data. In some examples, the based on the nature of the deviation between the measured vibration response data and the expected vibration response data, the door analyzer 114 determines the type of defect. FIG. 2B is a graph 204 of the FFT analysis of the measured vibration response data 206 compared to the expected vibration response data 202. In FIG. 2B, the modes of the measured vibration response data 206 are shifted compared to the modes of the expected vibration response data 202. This could indicate that one or more welds are missing and/or broken. FIG. 2C is a graph 208 of the FFT analysis of the measured vibration response data 206 compared to the expected vibration response data 202. In FIG. 2C, the amplitude of the measured vibration response data 206 is shifted compared to the amplitude of the expected vibration response data 202. This could indicate that the crash beam is unbonded or misaligned. For example, the FFT analysis of the measured vibration response data 206 may have a shifted mode and a shifted amplitude that indicates defects in both the crash beam and welds.

After the doors 110 are tested, the door analyzer 114 provides the results (e.g., the pass/fail status of each door, etc.). The door analyzer 114 displays the test results on, for example, the center console display of the infotainment head unit 108. In some examples, the door analyzer 114 sends the results and/or the FFT analysis of the measured vibration response data to the remote server to be stored in association with an identifier of the vehicle 100.

In one examples, the vehicle 100 includes (a) the vibration exciters 102 position in a cavity of the door 110 attached to the inner side of the outer door skin and (b) the vibration sensors 104 affixed to the windows 112 of the doors 110. In response to an input from the infotainment head unit 108 and/or a remove server, the door analyzer 114 selects one or more of the doors 110 and performs vibrates the outer skin of the door(s) 100 with a sine sweep (e.g., from 20 Hz to 200 Hz, etc.) while measuring the vibration response of the door with the vibration sensors 104. The door analyzer 114 performs FFT analysis on the measured vibration response data and compares the results to the expected vibration response data. The door analyzer 114 determines that the door 110 passes when the measured vibration response data satisfies the expected vibration response data (e.g., is within the tolerance band defined by the expected vibration response data). The door analyzer 114 determines that the door 110 fails when the measured vibration response data does not satisfy the expected vibration response data (e.g., is outside the tolerance band defined by the expected vibration response data). The door analyzer 114 repeats this process until all of the doors 110 are tested. The door analyzer 114 displays and/or transmits the results to a remote server so that corrective action can be taken if one or more of the doors 110 do not pass. In some examples, the door analyzer 114 also displays a suspected cause of the failure (e.g., a broken or missing weld, an improperly bonded crash beam, etc.) In such a manner, the doors 110 can be tested after they have been installed in the vehicle 100. This provides increase quality control of the vehicle 100 while not meaningfully adding time to the manufacturing process. As such, the acoustic performance of the vehicles 100 is improved.

In another example, the vehicle 100 includes the vibration exciters 102 position in a cavity of the door 110 attached to the inner side of the outer door skin. The vibration sensors 104 are temporarily affixed to the windows 112 of the doors 110. In response to an input from the infotainment head unit 108 and/or a remove server, the door analyzer 114 selects one or more of the doors 110 and performs vibrates the outer skin of the door(s) 100 with a sine sweep (e.g., from 20 Hz to 200 Hz, etc.). The vibration sensors 104 measure the vibration response of the door 110. The vibration sensors 104 then transmit the data to the door analyzer 114 (e.g., via the on-board communication module 106, etc.) and/or the remote server. The door analyzer 114 performs FFT analysis on the measured vibration response data and compares the results to the expected vibration response data. The door analyzer 114 determines that the door 110 passes when the measured vibration response data satisfies the expected vibration response data (e.g., is within the tolerance band defined by the expected vibration response data). The door analyzer 114 determines that the door 110 fails when the measured vibration response data does not satisfy the expected vibration response data (e.g., is outside the tolerance band defined by the expected vibration response data). The door analyzer 114 repeats this process until all of the doors 110 are tested. The door analyzer 114 displays and/or transmits the results to a remote server so that corrective action can be taken if one or more of the doors 110 do not pass. In such a manner, the doors 110 can be tested after they have been installed in the vehicle 100. This provides increase quality control of the vehicle 100 while not meaningfully adding time to the manufacturing process. As such, the acoustic performance of the vehicles 100 is improved.

FIG. 3 is a block diagram of electronic components 300 of the vehicle 100 of FIG. 1. In the illustrated example, the electronic components 300 include the vibration exciters 102, the vibration sensors 104, the on-board communication module 106, the infotainment head unit 108, and a vehicle data bus 302.

The infotainment head unit 108 includes a processor or controller 304 and memory 306. In the illustrated example, the infotainment head unit 108 is structured to include door analyzer 114. Alternatively, in some examples, the door analyzer 114. may be incorporated into another electronic control unit (ECU), such as the body control unit or an on-board computing platform. The processor or controller 304 may be any suitable processing device or set of processing devices such as, but not limited to: a microprocessor, a microcontroller-based platform, a suitable integrated circuit, one or more field programmable gate arrays (FPGAs), and/or one or more application-specific integrated circuits (ASICs). The memory 306 may be volatile memory (e.g., RAM, which can include non-volatile RAM, magnetic RAM, ferroelectric RAM, and any other suitable forms); non-volatile memory (e.g., disk memory, FLASH memory, EPROMs, EEPROMs, non-volatile solid-state memory, etc.), unalterable memory (e.g., EPROMs), read-only memory, and/or high-capacity storage devices (e.g., hard drives, solid state drives, etc.). In some examples, the memory 306 includes multiple kinds of memory, particularly volatile memory and non-volatile memory. In some examples, the memory 306 stores the expected vibration response data for the make and/or model of the vehicle 100.

The memory 306 is computer readable media on which one or more sets of instructions, such as the software for operating the methods of the present disclosure can be embedded. The instructions may embody one or more of the methods or logic as described herein. In a particular embodiment, the instructions may reside completely, or at least partially, within any one or more of the memory 306, the computer readable medium, and/or within the processor 304 during execution of the instructions.

The terms "non-transitory computer-readable medium" and "tangible computer-readable medium" should be understood to include a single medium or multiple media, such as a centralized or distributed database, and/or associated caches and servers that store one or more sets of instructions. The terms "non-transitory computer-readable medium" and "tangible computer-readable medium" also include any tangible medium that is capable of storing, encoding or carrying a set of instructions for execution by a processor or that cause a system to perform any one or more of the methods or operations disclosed herein. As used herein, the term "tangible computer readable medium" is expressly defined to include any type of computer readable storage device and/or storage disk and to exclude propagating signals.

The vehicle data bus 302 communicatively couples the on-board communication module 106 and the infotainment head unit 108. In some examples, the vehicle data bus 302 includes one or more data buses. The vehicle data bus 302 may be implemented in accordance with a controller area network (CAN) bus protocol as defined by International Standards Organization (ISO) 11898-1, a Media Oriented Systems Transport (MOST) bus protocol, a CAN flexible data (CAN-FD) bus protocol (ISO 11898-7) and/a K-line bus protocol (ISO 9141 and ISO 14230-1), and/or an Ethernet™ bus protocol IEEE 802.3 (2002 onwards), etc.

Figure 4:
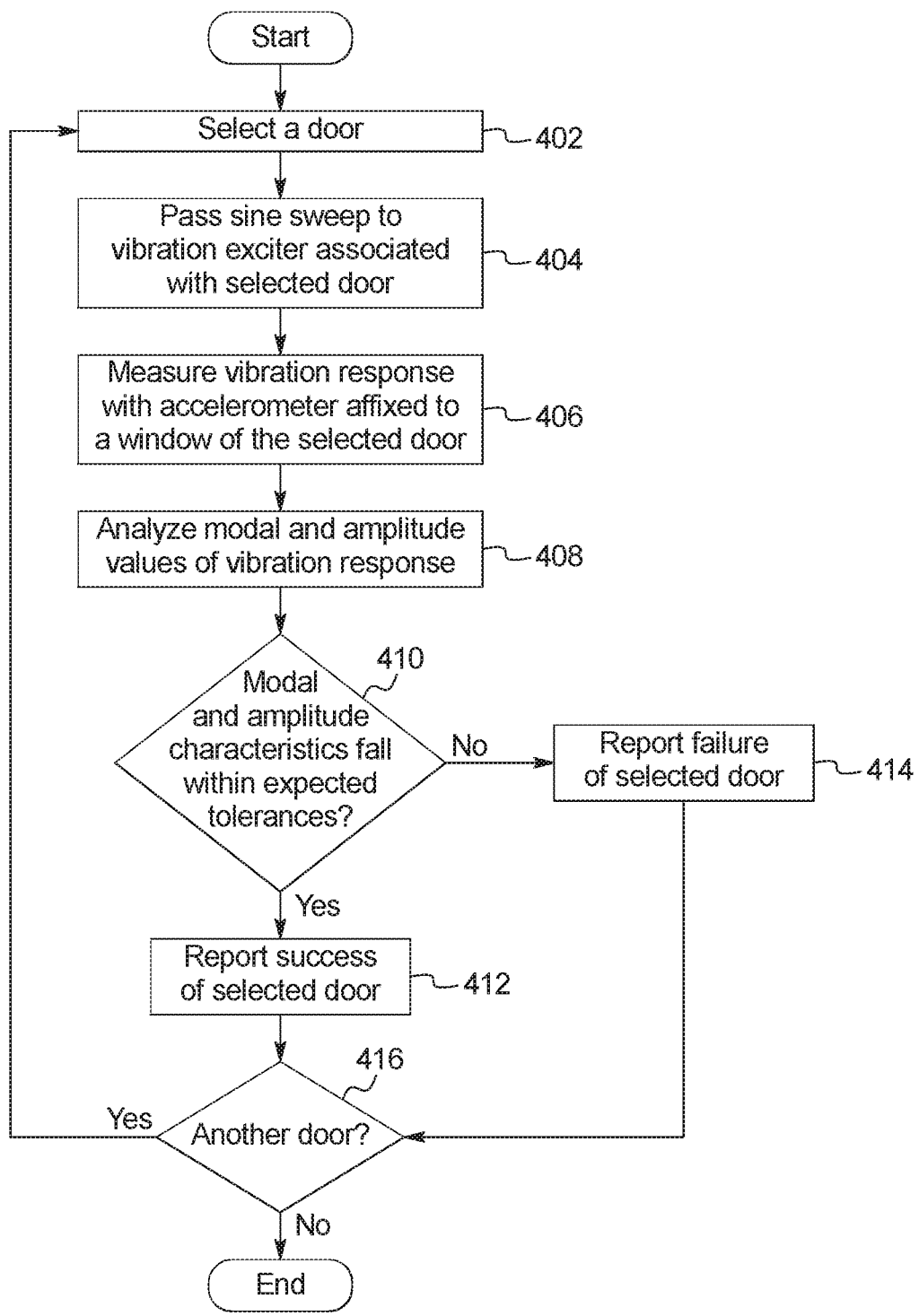
FIG. 4 is a flowchart of an example method to verify the quality of a door while the door is installed in the vehicle, which may be implemented by the electronic components of FIG. 3.

FIG. 4 is a flowchart of an example method to verify the quality of a door 110 while the door 110 is installed in the vehicle 100, which may be implemented by the electronic components 300 of FIG. 3. In some examples, the method of FIG. 4 begins in response to the door analyzer 114 receiving an input to initiate testing of the doors 110. In some such examples, the door analyzer 114 performs the method of FIG. 4 when the vehicle 100 is in a diagnostic mode and/or when the vehicle 100 is not in motion. Initially, at block 402, the door analyzer 114 selects one of the doors 110. At block 404, the door analyzer 114 passes a sine sweep to the vibration exciter 102 associated with the selected door 110. At block 406, the door analyzer 114 measures the vibration response of the door 110 to the sine sweep with the vibration sensor 104 associated with the selected door 110. At block 408, the door analyzer 114 performs an FFT analysis on the measured vibration response data and analyzes the modal and amplitude values in comparison with the modes and amplitudes of the expected vibration response data.

At block 410, the door analyzer 114 determines whether the modal and amplitude characteristics of the measured vibration data fall within expected tolerances defined by the expected vibration response data. When the modal and amplitude characteristics of the measured vibration data fall within expected tolerances defined by the expected vibration response data, the method continues at block 412. Otherwise, when the modal and amplitude characteristics of the measured vibration data do not fall within expected tolerances defined by the expected vibration response data, the method continues at block 414. At block 412, the door analyzer 114 reports that the selected door has passed. At block 414, the door analyzer 114 reports that the selected door has failed. In some examples, the door analyzer 114 reports the probable cause of the failure based on the characteristics of the measured vibration response data and the manner in which the measured vibration response data deviated from the expected vibration response data.

At block 416, the door analyzer 114 determines whether there is another door to be tested. When there is another door to be tested, the method returns to block 402. Otherwise, when there is not another door to be tested, the method ends.

The flowchart of FIG. 4 is representative of machine readable instructions stored in memory (such as the memory 306 of FIG. 6) that comprise one or more programs that, when executed by a processor (such as the processor 304 of FIG. 3), cause the vehicle 100 to implement the example door analyzer 114 of FIGS. 1 and 3. Further, although the example program(s) is/are described with reference to the flowchart illustrated in FIG. 4, many other methods of implementing the example door analyzer 114 may alternatively be used. For example, the order of execution of the blocks may be changed, and/or some of the blocks described may be changed, eliminated, or combined.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". As used here, the terms "module" and "unit" refer to hardware with circuitry to provide communication, control and/or monitoring capabilities, often in conjunction with sensors. "Modules" and "units" may also include firmware that executes on the circuitry. The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A vehicle comprising:
a vibration exciter affixed to a door;
a vibration sensor affixed to a window of the door;
memory storing expected vibration data; and
a processor to:
perform, via the vibration exciter, a sine sweep on the door;
measure, via the vibration sensor, a vibration response of the door to the sine sweep;
perform a Fast Fourier transform on the measured vibration response to identify modes and amplitudes of the measured vibration response; and
determine that one or more welds are missing from the door based on a determination that the modes of the measured vibration response are shifted compared to modes of the expected vibration data.

2. The vehicle of claim 1, wherein the vibration exciter is affixed in a cavity of the door to an inner side of an outer door skin.

3. The vehicle of claim 1, wherein the vibration exciter is a surface transducer.

4. The vehicle of claim 1, wherein the vibration sensor is an accelerometer electrically coupled to the processor.

5. The vehicle of claim 1, wherein the vibration sensor includes an accelerometer and a wireless module, the vibration sensor wirelessly communicatively coupled to the processor.

6. The vehicle of claim 5, wherein the vibration sensor is temporarily affixed to the window of the door.

7. The vehicle of claim 1, wherein the sine sweep is from 20 Hz to 200 Hz.

8. The vehicle of claim 1, wherein the vibration sensor is mounted proximate to a corner of the window or is mounted inside a cavity of an edge of the window beneath a regulator of the window.

9. A method to validate acoustic properties of a door of a vehicle, the method comprising:
performing, using a processor and via a vibration exciter affixed to the door, a sine sweep on the door;
measuring, via a vibration sensor affixed to a window of the door, a vibration response of the door to the sine sweep;
performing a Fast Fourier transform on the measured vibration response to identify modes and amplitudes of the measured vibration response; and
determining that a crash beam is unbonded or misaligned based on a determination that an amplitude of the measured vibration response data is shifted compared to the amplitude of expected vibration data associated with the door.

10. The method of claim 9, wherein the vibration exciter is affixed in a cavity of the door to an inner side of an outer door skin.

11. The method of claim 9, wherein the vibration exciter is a surface transducer.

12. The method of claim 9, wherein the vibration sensor is an accelerometer electrically coupled to the processor.

13. The method of claim 9, wherein the vibration sensor includes an accelerometer and a wireless module, the vibration sensor wirelessly communicatively coupled to the processor.

14. The method of claim 13, wherein the vibration sensor is temporarily affixed to the window of the door.

15. The method of claim 9, wherein the sine sweep is from 20 Hz to 200 Hz.

* * * * *